(12) United States Patent
Cheng et al.

(10) Patent No.: US 12,366,697 B1
(45) Date of Patent: Jul. 22, 2025

(54) ELECTRONIC DEVICE

(71) Applicant: Merry Electronics(Shenzhen) Co., Ltd., ShenZhen (CN)

(72) Inventors: Ching Tse Cheng, Taichung (TW); Chun-Han Chen, Taichung (TW)

(73) Assignee: Merry Electronics(Shenzhen) Co., Ltd., ShenZhen (CN)

( * ) Notice: Subject to any disclaimer, the term of this patent is extended or adjusted under 35 U.S.C. 154(b) by 0 days.

(21) Appl. No.: 18/884,064

(22) Filed: Sep. 12, 2024

(30) Foreign Application Priority Data

Aug. 23, 2024 (TW) .................................. 113131828

(51) Int. Cl.
*F21V 8/00* (2006.01)
(52) U.S. Cl.
CPC ......... *G02B 6/0018* (2013.01); *G02B 6/0091* (2013.01)
(58) Field of Classification Search
CPC .............................. G02B 6/0018; G02B 6/0091
See application file for complete search history.

(56) References Cited

U.S. PATENT DOCUMENTS

| | | | | |
|---|---|---|---|---|
| 8,641,219 | B1* | 2/2014 | Johnson | G02B 6/0021 362/97.3 |
| 2011/0134369 | A1* | 6/2011 | Song | G02B 6/0018 349/65 |
| 2013/0070479 | A1* | 3/2013 | Ito | G02B 6/0068 362/609 |
| 2013/0286667 | A1* | 10/2013 | Sampsell | F21V 23/06 52/741.1 |
| 2015/0003109 | A1* | 1/2015 | Wu | G02B 6/0035 362/612 |
| 2020/0209461 | A1* | 7/2020 | Achi | G02B 6/0045 |

OTHER PUBLICATIONS

Kotani et al., WO 2014038117, Mar. 2014 (Year: 2014).*

* cited by examiner

*Primary Examiner* — Mary Ellen Bowman
(74) *Attorney, Agent, or Firm* — JCIPRNET

(57) ABSTRACT

An electronic device includes a casing including an annular light-emitting area, a plurality of directly-lit light sources, a light guide plate disposed between the directly-lit light sources and the annular light-emitting area, and a light-shielding rib structure located between the directly-lit light sources, and separating any two adjacent ones of the directly-lit light sources. The light guide plate includes opposite first and second surfaces and a plurality of recessed structures recessed in the second surface. The recessed structure has a corresponding semi-conical surface, and the semi-conical surface faces a zone of the light guide plate. The directly-lit light sources face the first surface and respectively correspond to the semi-conical surfaces. Light emitted by the directly-lit light sources enters the light guide plate and is reflected by the semi-conical surfaces, passes through the zones of the light guide plate, and is transmitted to the annular light-emitting area to emit outwardly.

12 Claims, 7 Drawing Sheets

ELECTRONIC DEVICE

CROSS-REFERENCE TO RELATED APPLICATION

This application claims the priority benefit of Taiwan application serial no. 113131828, filed on Aug. 23, 2024. The entirety of the above-mentioned patent application is hereby incorporated by reference herein and made a part of this specification.

BACKGROUND

Technical Field

The disclosure relates to an electronic device, and particularly relates to an electronic device having an annular light-emitting area.

Description of Related Art

It is known that when a conventional electronic device is to have a structure that emits light uniformly throughout the entire circle, a plurality of directly-lit light sources need to be used to achieve the effect of uniform light emission, but this will consume more power. To reduce the number of light sources, side-emitting light sources with higher unit prices need to be used, but this will increase the cost.

SUMMARY

The disclosure provides an electronic device that may uniformly emit light in an annular shape and has lower cost.

An electronic device of the disclosure includes a casing, a plurality of directly-lit light sources, a light guide plate, and a light-shielding rib structure. The casing includes an annular light-emitting area. The directly-lit light sources are spaced apart from each other and disposed in the casing. The light guide plate is disposed between the directly-lit light sources and the annular light-emitting area, and includes a first surface and a second surface opposite to each other and a plurality of recessed structures recessed in the second surface. The recessed structures have a plurality of semi-conical surfaces, and each recessed structure has the corresponding semi-conical surface. The semi-conical surfaces face a plurality of zones of the light guide plate, and each semi-conical surface faces the corresponding zone. The directly-lit light sources face the first surface and respectively correspond to these semi-conical surfaces. The light-shielding rib structure is located between the directly-lit light sources, and separates any two adjacent ones of the directly-lit light sources. Light emitted by the directly-lit light sources enters the light guide plate and is reflected by the semi-conical surfaces, passes through the zones of the light guide plate, and is transmitted to the annular light-emitting area to emit outwardly.

In an embodiment of the disclosure, the light guide plate includes a plurality of extension portions respectively protruding from the first surface toward the directly-lit light sources, and a projection of the recessed structures on the first surface at least partially overlaps a projection of the extension portions on the first surface.

In an embodiment of the disclosure, a projection area of each of the recessed structures on the first surface is greater than a projection area of the corresponding directly-lit light source on the first surface, and a projection area of each of the extension portions on the first surface is greater than the projection area of the corresponding directly-lit light source on the first surface.

In an embodiment of the disclosure, a depth of the recessed structures is the same as a thickness of the light guide plate between the first surface and the second surface.

In an embodiment of the disclosure, each of the recessed structures includes a flat surface and the semi-conical surface connected to the flat surface, and an included angle between the semi-conical surface and the flat surface is 45 degrees.

In an embodiment of the disclosure, the light guide plate includes a through groove, and the light-shielding rib structure is fixed to the casing, passes through the through groove, and protrudes from the first surface.

In an embodiment of the disclosure, the light guide plate includes a light-emitting slope facing the annular light-emitting area.

In an embodiment of the disclosure, the annular light-emitting area includes a plurality of segments, the segments respectively correspond to the zones, and the segments have a same length.

In an embodiment of the disclosure, the segments include a plurality of midpoints, and there are a plurality of distances between the midpoints and a projection of the corresponding directly-lit light source on a plane where the annular light-emitting area is located, and the distances have an equal length.

In an embodiment of the disclosure, each of the segments includes a corresponding midpoint, a distance between the midpoint and a projection of the corresponding directly-lit light source on a plane where the annular light-emitting area is located is used as a radius, a circle is drawn with the midpoint as a center, and among a plurality of circles drawn with the radius from the midpoint, any two adjacent ones partially overlap.

In an embodiment of the disclosure, the light emitted by the directly-lit light sources has different wavelengths, and a number of the directly-lit light sources is greater than or equal to 4.

In an embodiment of the disclosure, a depth of the semi-conical surface is the same as a bottom radius.

Based on the above, the electronic device of the disclosure disposes the light guide plate between the directly-lit light sources and the annular light-emitting area. The directly-lit light sources face the first surface of the light guide plate, and the plurality of recessed structures are recessed in the second surface of the light guide plate. Each recessed structure has the corresponding semi-conical surface, and each semi-conical surface faces the corresponding zone on the light guide plate. The directly-lit light sources respectively correspond to the semi-conical surfaces. The light-shielding rib structure separates any two adjacent ones of the directly-lit light sources. The light emitted by the directly-lit light sources enters the light guide plate and is reflected by the semi-conical surfaces, passes through the zones of the light guide plate, and is transmitted to the annular light-emitting area to emit outwardly. Therefore, the electronic device of the disclosure may emit light uniformly in the annular light-emitting area. Compared with the conventional design of a side-emitting light source and a light guide plate, the electronic device of the disclosure is designed with a directly-lit light source and a light guide plate having a semi-conical surface, and thus has a lower cost.

DESCRIPTION OF THE EMBODIMENTS

Figure 1:
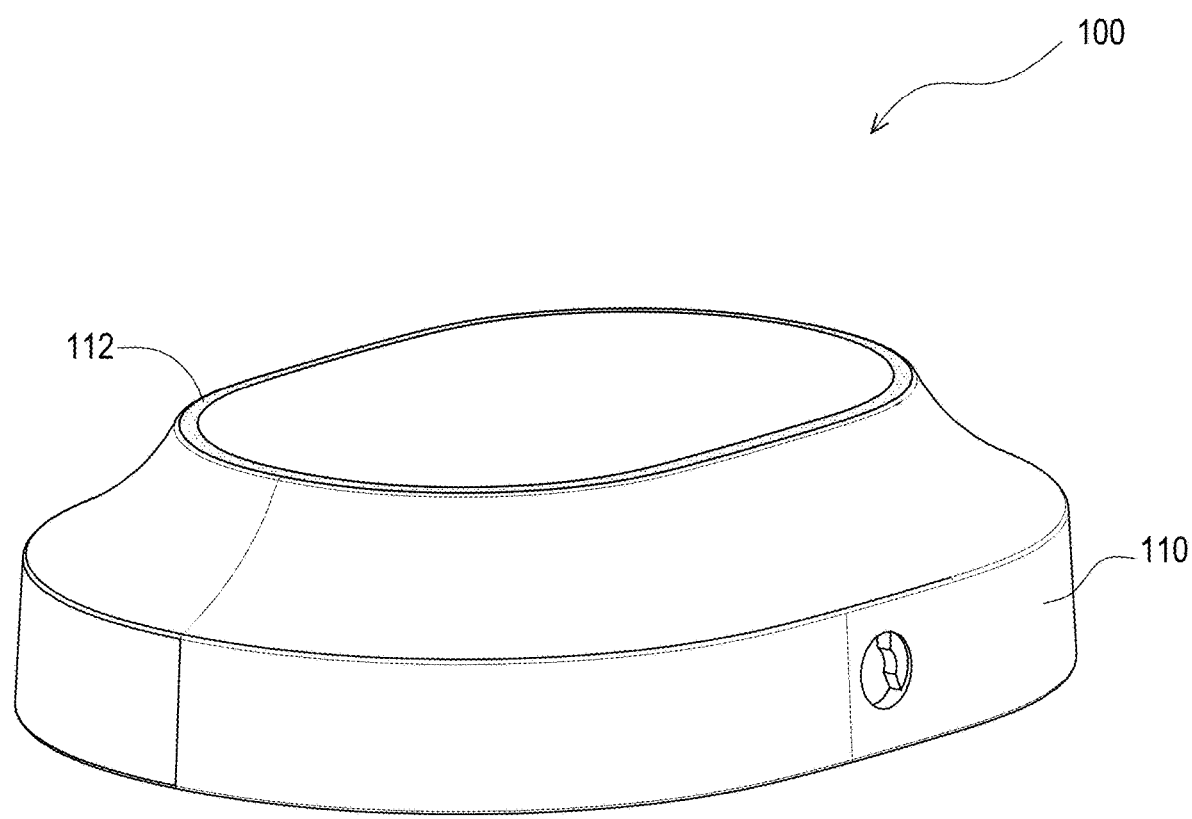
FIG. 1 is a schematic diagram of an appearance of an electronic device according to an embodiment of the disclosure.
Figure 2A:
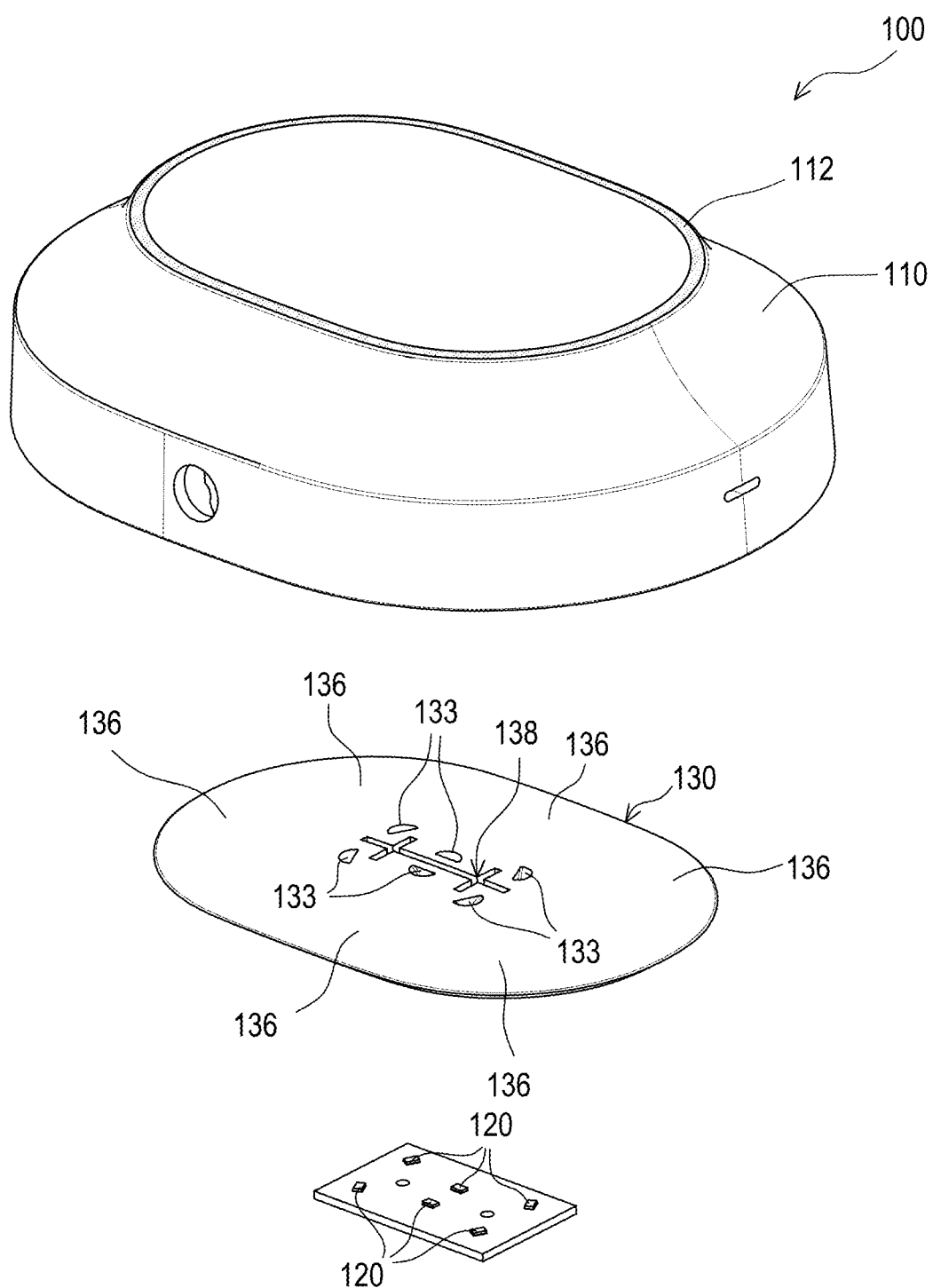
FIG. 2A and FIG. 2B are schematic exploded diagrams of the electronic device of FIG. 1 from different viewing angles.
Figure 2B:
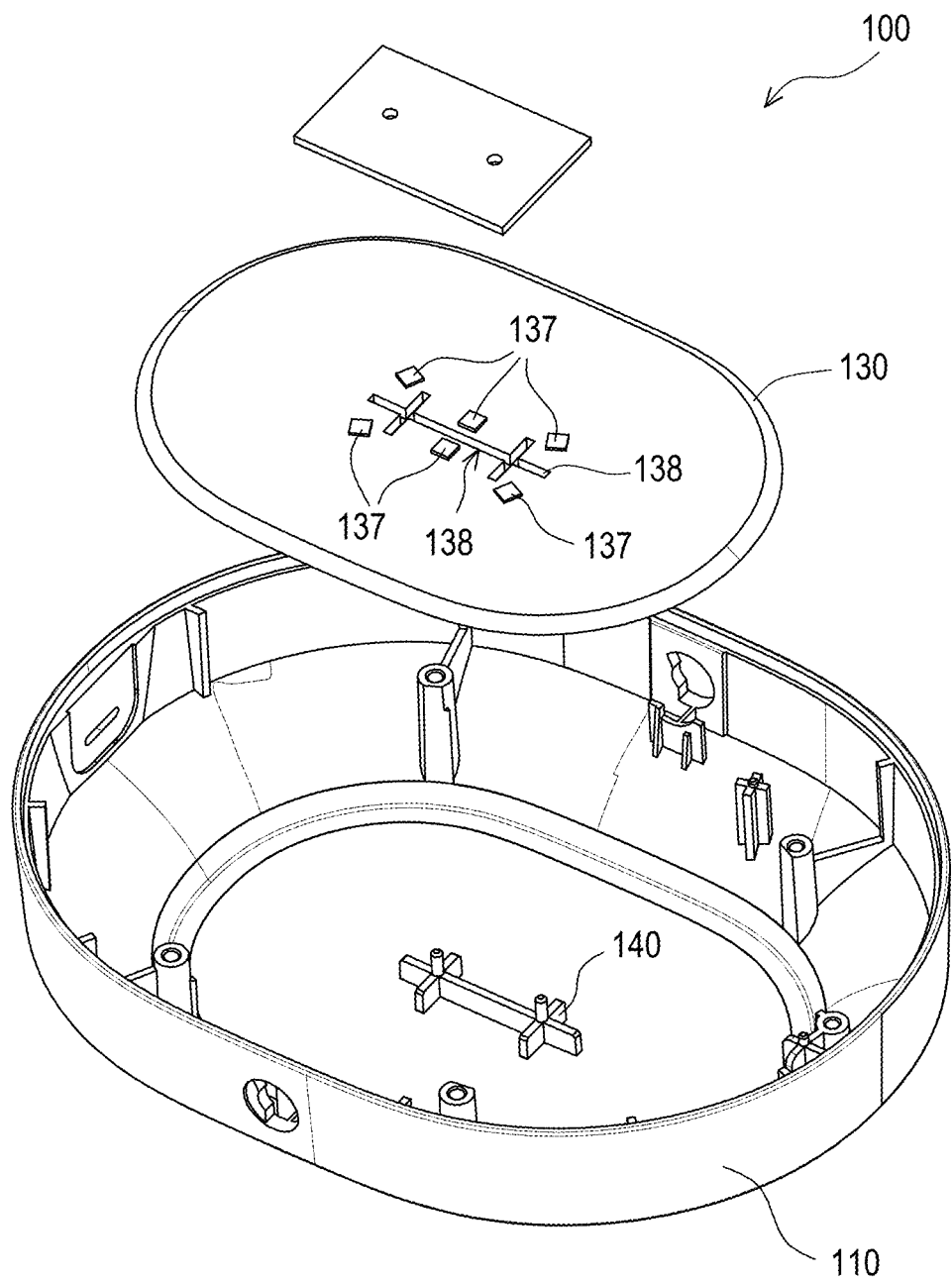
Figure 3:
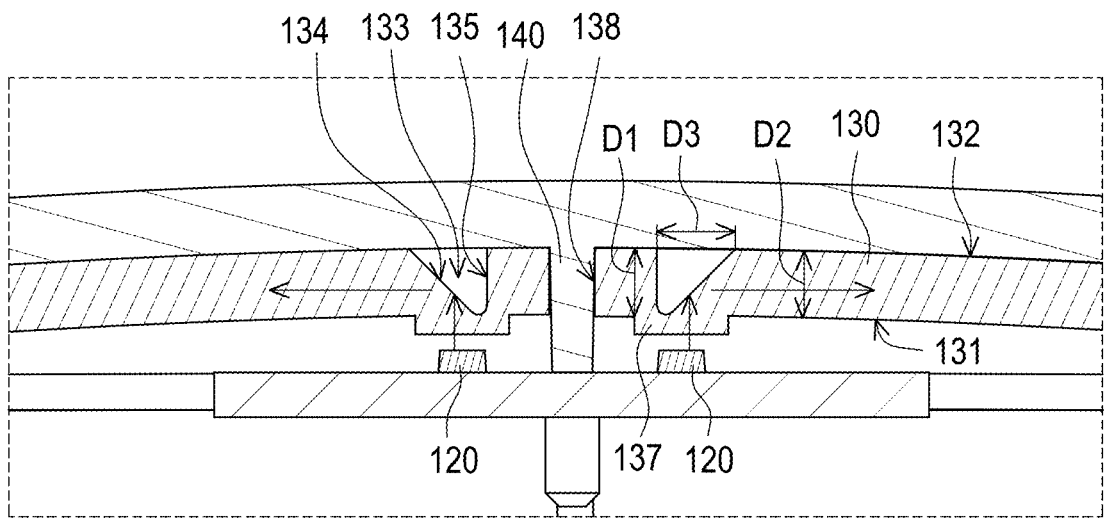
FIG. 3 and FIG. 4 are partial schematic cross-sectional diagrams of the electronic device of FIG. 1 in different areas.
Figure 4:
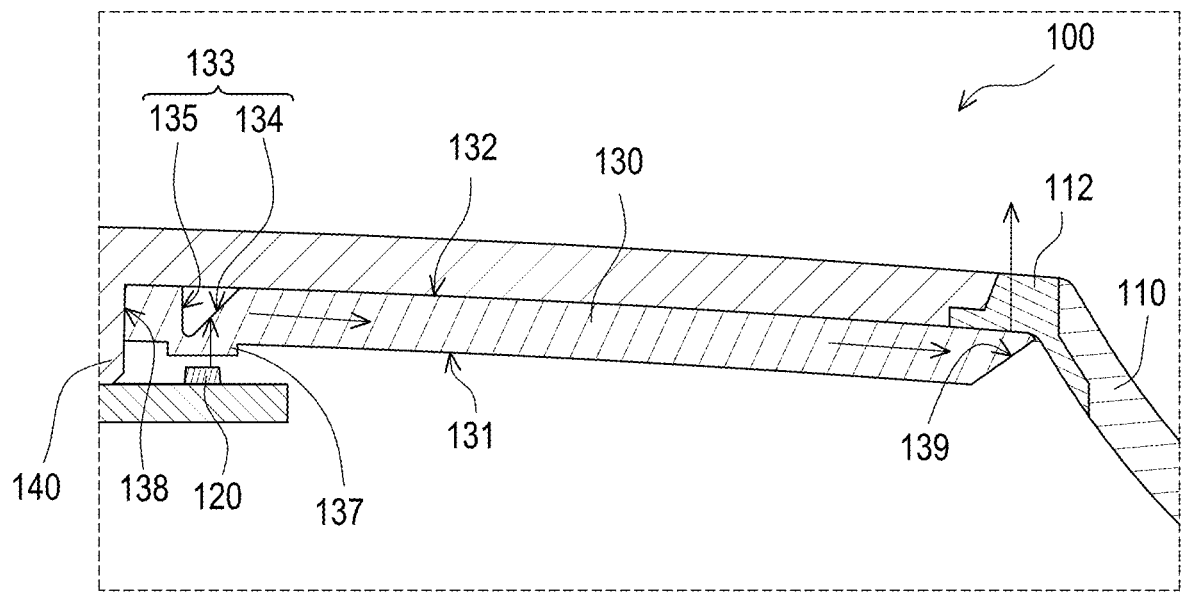

FIG. 1 is a schematic diagram of an appearance of an electronic device according to an embodiment of the disclosure. FIG. 2A and FIG. 2B are schematic exploded diagrams of the electronic device of FIG. 1 from different viewing angles. FIG. 3 and FIG. 4 are partial schematic cross-sectional diagrams of the electronic device of FIG. 1 in different areas. It should be noted that FIG. 1 only shows the components related to the disclosure in the electronic device, and omits the remaining components.

Referring to FIG. 1 to FIG. 4, an electronic device 100 in the embodiment is, for example, an earphone, but the type of the electronic device 100 is not limited thereto. The electronic device 100 of the embodiment includes a casing 110, a plurality of directly-lit light sources 120, a light guide plate 130, and a light-shielding rib structure 140.

The casing 110 includes an annular light-emitting area 112. The annular light-emitting area 112 is, for example, a solid and transparent area, but is not limited thereto. The directly-lit light sources 120 are spaced apart from each other and disposed in the casing 110. In the embodiment, the light emitted by the directly-lit light sources 120 may have different wavelengths, thereby providing colorful visual effects. Of course, the light emitted by the directly-lit light sources 120 may also have the same wavelength.

As shown in FIG. 2A and FIG. 3, the light guide plate 130 is disposed between the directly-lit light sources 120 and the annular light-emitting area 112, and includes a first surface 131 and a second surface 132 opposite to each other and a plurality of recessed structures 133 recessed in the second surface 132. The recessed structures 133 have a plurality of semi-conical surfaces 134, and each recessed structure 133 has the corresponding semi-conical surface 134.

As shown in FIG. 2A, the semi-conical surfaces 134 face a plurality of zones 136 of the light guide plate 130, and each semi-conical surface 134 faces the corresponding zone 136 of the light guide plate 130. The directly-lit light sources 120 face the first surface 131 (FIG. 3) and respectively correspond to the semi-conical surfaces 134.

Such a design allows the light emitted by the directly-lit light sources 120 to be reflected by the semi-conical surface 134 after entering the light guide plate 130. Due to the shape of the semi-conical surface 134, the light may be expanded to a larger angle range within the light guide plate 130.

In the embodiment, the thickness of the light guide plate 130 is, for example, 1.5 to 2 mm, which is quite space-saving, but the thickness of the light guide plate 130 is not limited thereto.

As shown in FIG. 2B and FIG. 3, the light-shielding rib structure 140 is located between the directly-lit light sources 120 and separates any two adjacent ones of the directly-lit light sources 120 to prevent the light emitted by the adjacent directly-lit light sources 120 from mixing and affecting the color of the light transmitted to the annular light-emitting area 112.

In addition, the light guide plate 130 includes a through groove 138, and the light-shielding rib structure 140 is fixed to the casing 110, passes through the through groove 138, and protrudes from the first surface 131 of the light guide plate 130. The light-shielding rib structure 140 is, for example, a double cross design, which may provide positioning in two directions. Of course, the light-shielding rib structure 140 may be adjusted according to the number of directly-lit light sources 120 and the direction in which they need to be positioned.

As shown in FIG. 3, in the embodiment, a depth D1 of the recessed structures 133 is the same as a thickness D2 of the light guide plate 130 between the first surface 131 and the second surface 132. Such a design may ensure that the light entering the light guide plate 130 may be maximized to be reflected by the semi-conical surface 134 of the recessed structure 133 and transmitted in an expected direction.

In addition, in the embodiment, each of the recessed structures 133 includes a flat surface 135. The semi-conical surface 134 is connected to the flat surface 135, and an included angle θ between the semi-conical surface 134 and the flat surface 135 is 45 degrees. That is to say, in the embodiment, the depth D1 (i.e., the axial height) of the semi-conical surface 134 is the same as a bottom radius D3. Such a design may better transmit light over long distances and reduce the chance of light attenuation.

In addition, the light guide plate 130 includes a plurality of extension portions 137 respectively protruding from the first surface 131 toward the directly-lit light sources 120, so that the light emitted by the directly-lit light sources 120 may enter the light guide plate 130 to the maximum extent.

In the embodiment, the thickness D2 of the light guide plate 130 between the first surface 131 and the second surface 132 is 1.5 mm, for example, but is not limited thereto. The thickness of the extension portion 137 is, for example, 0.5 mm, but is not limited thereto. Since the depth D1 of the semi-conical surface 134 is close to the thickness D2 between the first surface 131 and the second surface 132, the design of the extension portion 137 may be used as a portion for connecting structures near the recessed structure 133, so that the recessed structure 133 may formed on the light guide plate 130.

As shown in FIG. 4, in the embodiment, the light guide plate 130 includes a light-emitting slope 139 facing the annular light-emitting area 112. The light emitted by the directly-lit light sources 120 enters the light guide plate 130 and is reflected by the semi-conical surfaces 134, passes through the zones 136 of the light guide plate 130, is reflected by the light-emitting slope 139, and is transmitted to the annular light-emitting area 112 to emit outwardly.

Of course, in other embodiments, if the annular light-emitting area 112 is located on the side of the casing 110, the light guide plate 130 may not be designed with the light-emitting slope 139, as long as the light may be transmitted to the annular light-emitting area 112.

Figure 5A:
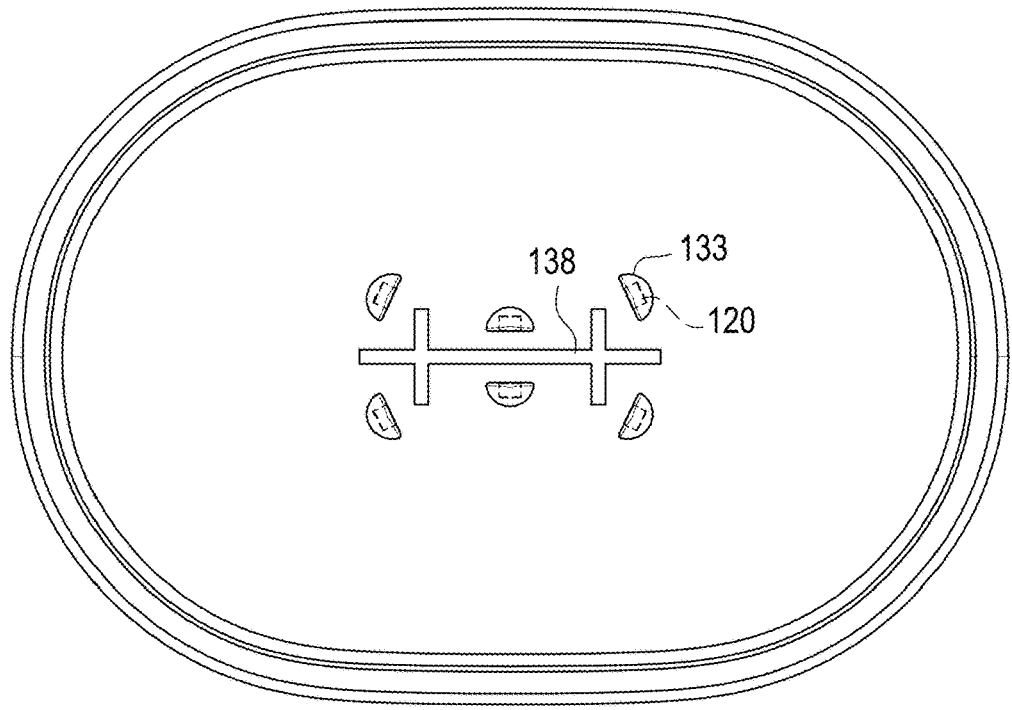
FIG. 5A is a corresponding schematic diagram of the recessed structure and the directly-lit light source of the electronic device of FIG. 1.

FIG. 5A is a corresponding schematic diagram of the recessed structure and the directly-lit light source of the electronic device of FIG. 1. It should be noted that in FIG. 5A, the directly-lit light source 120 is represented by a dotted line. Referring to FIG. 5A, in the embodiment, each of the recessed structures 133 at least partially overlaps the corresponding directly-lit light source 120. In addition, the projection area of each of the recessed structures 133 on the first surface 131 (FIG. 3) is larger than the projection area of the corresponding directly-lit light source 120 on the first surface 131.

Figure 5B:
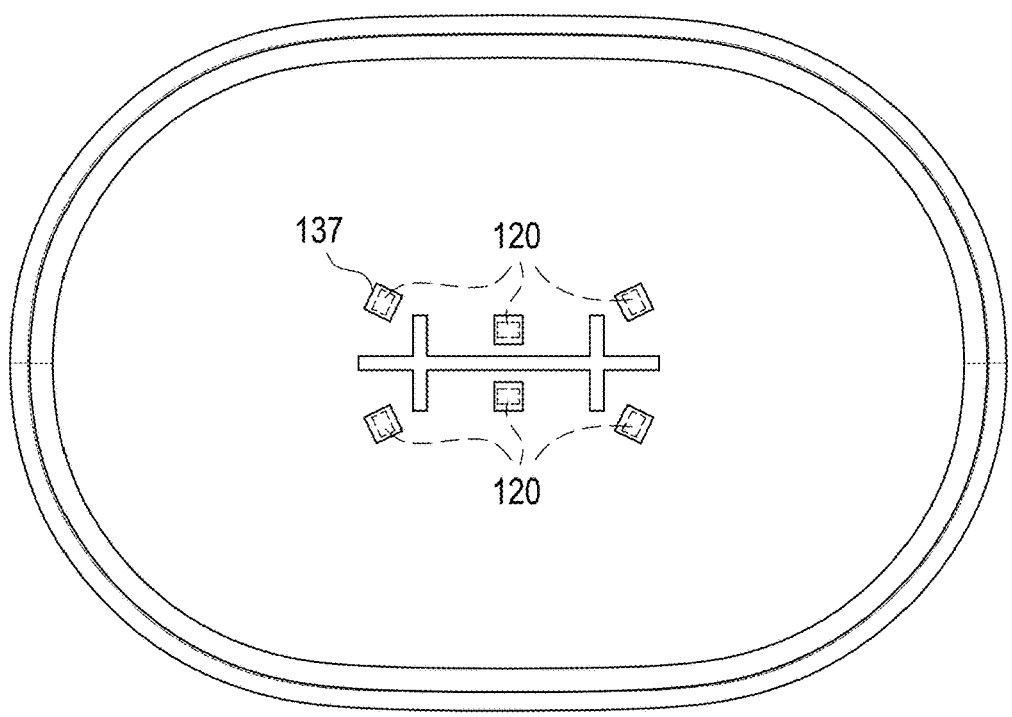
FIG. 5B is a corresponding schematic diagram of the extension portion and the directly-lit light source of the electronic device of FIG. 1.

FIG. 5B is a corresponding schematic diagram of the extension portion and the directly-lit light source of the electronic device of FIG. 1. It should be noted that in FIG. 5B, the directly-lit light source 120 is represented by a dotted line. Referring to FIG. 5B, in the embodiment, each of the extension portions 137 at least partially overlaps the corresponding directly-lit light source 120. In addition, the projection area of each of the extension portions 137 on the first surface 131 is larger than the projection area of the corresponding directly-lit light source 120 on the first surface 131.

With reference to FIG. 5A and FIG. 5B, it may be seen that the projection of the recessed structures 133 on the first surface 131 at least partially overlaps the projection of the extension portions 137 on the first surface 131. The above design may ensure that the light emitted by the directly-lit light source 120 enters the extension portion 137 to the maximum extent and is reflected by the semi-conical surface 134 of the recessed structure 133.

Figure 6:
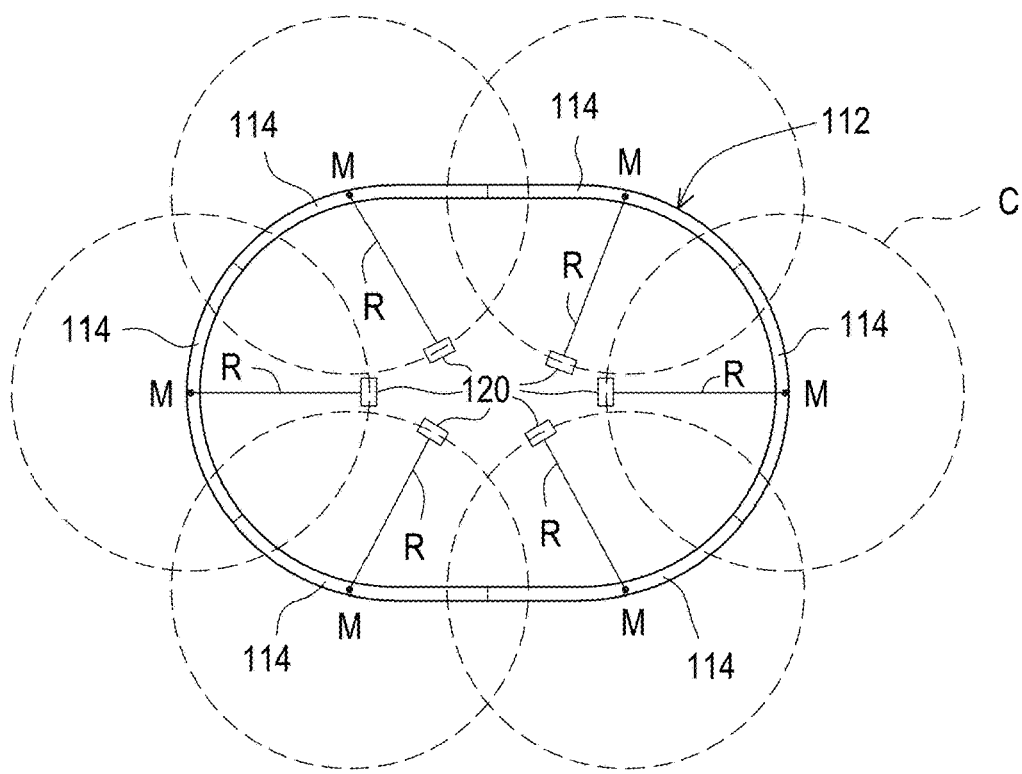
FIG. 6 is a corresponding schematic diagram of the directly-lit light source, the annular light-emitting area, and the circle of the electronic device of FIG. 1.

FIG. 6 is a corresponding schematic diagram of the directly-lit light source, the annular light-emitting area, and the circle of the electronic device of FIG. 1. Referring to FIG. 6, in the embodiment, the annular light-emitting area 112 includes a plurality of segments 114. The segments 114 are separated by dotted lines. In fact, the segments 114 are continuous. In the embodiment, the lengths of the segments 114 are equal, and the segments 114 respectively correspond to the zones 136 of the light guide plate 130 (FIG. 2A).

In the embodiment, the segments 114 include a plurality of midpoints M, and each segment 114 includes a corresponding midpoint M. There are a plurality of distances between the midpoints M and the projection of the corresponding directly-lit light source 120 on the plane where the annular light-emitting area 112 is located, and the distances have an equal length. Specifically, the distance between the midpoint M and the projection of the corresponding directly-lit light source 120 on the plane where the annular light-emitting area 112 is located is used as a radius R. With the midpoint M as the center and the radius R, a circle is drawn. Among a plurality of circles C drawn with the radius R from the midpoint M, its corresponding plurality of radii R have an equal length, and any two adjacent circles C partially overlap to ensure that each segment 114 is covered by the circle C, so that the light emitted by the directly-lit light source 120 has sufficient brightness when it reaches the corresponding segment 114. Since the annular light-emitting area 112 passes through the centers of the circles C, the annular light-emitting area 112 may have better brightness.

On the other hand, it may be seen from FIG. 6 that the light emitted by each directly-lit light source 120 will emit light toward the corresponding segment 114. The light emitted by the directly-lit light source 120 has greater brightness near the midpoint M of the segment 114. Therefore, each segment 114 is designed to be partially overlapped by two circles C away from the midpoint M, which improves the brightness there and allows the annular light-emitting area 112 to emit light uniformly.

In the embodiment, the partially overlapping area does not exceed, for example, ¼ of the circular area, so as to save the number of the directly-lit light sources 120 on the premise that the annular light-emitting area 112 has uniform brightness.

According to the design concept shown in FIG. 6, the designer may design the position and overlap degree of the circles according to the shape of the annular light-emitting area 112, and then may calculate the position and quantity of the directly-lit light sources 120 to provide a uniform light-emitting effect in the annular light-emitting area 112.

Figure 7:
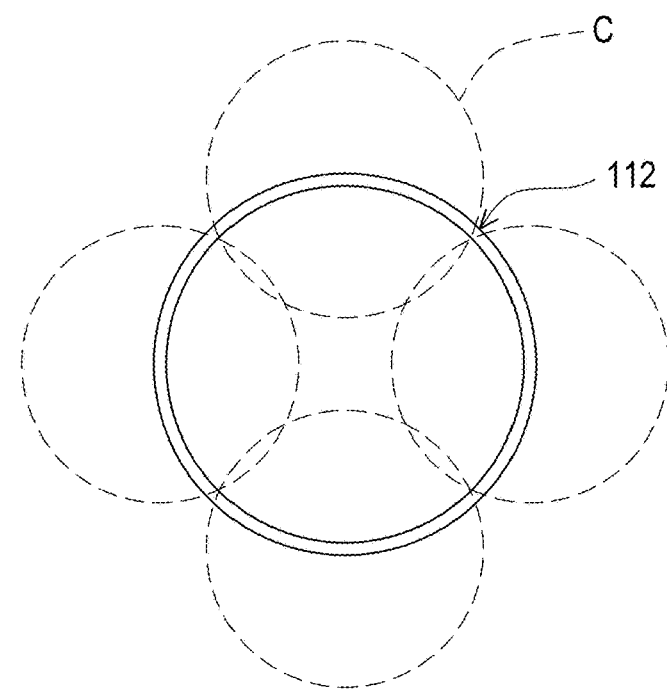
FIG. 7 to FIG. 9 are corresponding schematic diagrams of an annular light-emitting area and a circle according to other embodiments of the disclosure.
Figure 8:
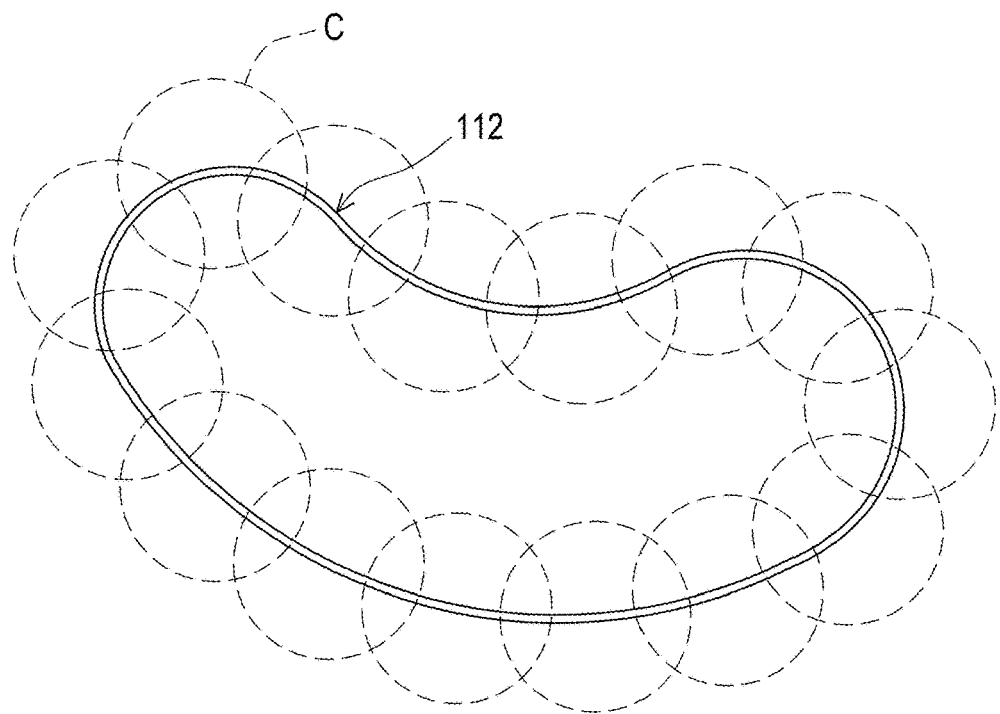
Figure 9:
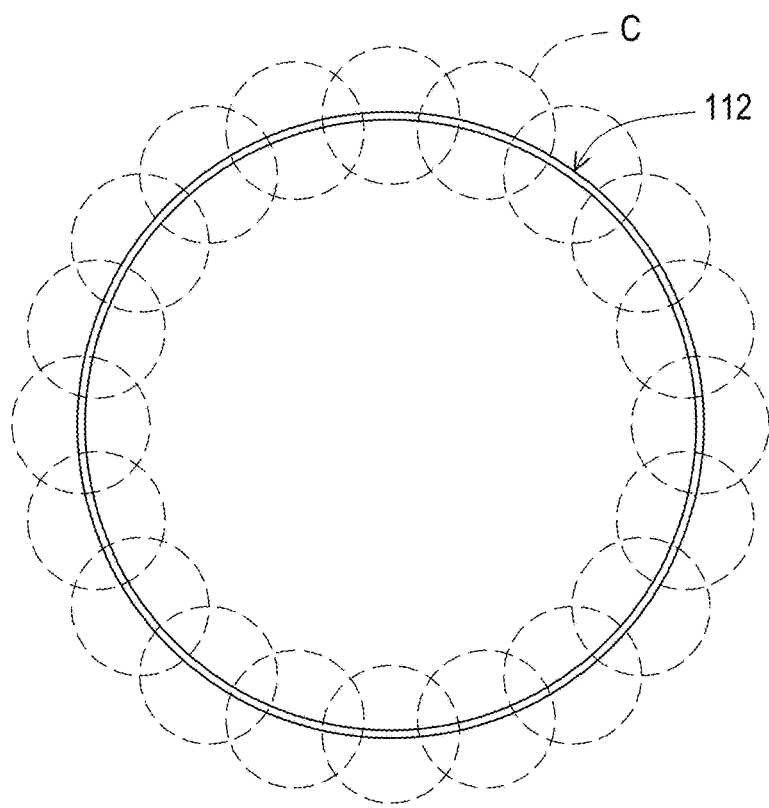

FIG. 7 to FIG. 9 are corresponding schematic diagrams of an annular light-emitting area and a circle according to other embodiments of the disclosure. Referring to FIG. 7 first, the annular light-emitting area 112 is a small circle, and four circles C may cover the annular light-emitting area 112. Therefore, at least four directly-lit light sources 120 (FIG. 6) may achieve uniform light effect.

Referring to FIG. 8 and FIG. 9, the annular light-emitting area 112 of FIG. 8 is irregular, and the annular light-emitting area 112 of FIG. 9 is a large circle. As may be seen from FIG. 7 to FIG. 9, by ensuring that every portion of the annular light-emitting area 112 is covered by the circles C, the directly-lit light source 120 may be disposed on the circumference of the circles C as shown in FIG. 6. Therefore, no matter whether the shape of the annular light-emitting area 112 is regular or not, uniform light with sufficient brightness may be emitted.

In summary, the electronic device of the disclosure disposes the light guide plate between the directly-lit light sources and the annular light-emitting area. The directly-lit light sources face the first surface of the light guide plate, and the plurality of recessed structures are recessed in the second surface of the light guide plate. Each recessed structure has the corresponding semi-conical surface, and each semi-conical surface faces the corresponding zone on the light guide plate. The directly-lit light sources respectively correspond to the semi-conical surfaces. The light-shielding rib structure separates any two adjacent ones of the directly-lit light sources. The light emitted by the directly-lit light sources enters the light guide plate and is reflected by the semi-conical surfaces, passes through the zones of the light guide plate, and is transmitted to the annular light-emitting area to emit outwardly. Therefore, the electronic device of the disclosure may emit light uniformly in the annular light-emitting area. Compared with the conventional design of a side-emitting light source and a light guide plate, the electronic device of the disclosure is designed with a directly-lit light source and a light guide plate having a semi-conical surface, and thus has a lower cost.

What is claimed is:

1. An electronic device, comprising:
   a casing, comprising an annular light-emitting area;
   a plurality of directly-lit light sources, spaced apart from each other, and disposed in the casing;
   a light guide plate, disposed between the directly-lit light sources and the annular light-emitting area, and comprising a first surface and a second surface opposite to each other and a plurality of recessed structures recessed in the second surface, wherein the recessed structures have a plurality of semi-conical surfaces, each of the recessed structures has the corresponding semi-conical surface, the semi-conical surfaces face a plurality of zones of the light guide plate, each of the semi-conical surfaces faces the corresponding zone, and the directly-lit light sources face the first surface and respectively face corresponding semi-conical surfaces; and a light-shielding rib structure, located between the directly-lit light sources, and configured to separate any two adjacent ones of the directly-lit light sources, wherein light emitted by the directly-lit light sources enters the light guide plate and is reflected by the semi-conical surfaces, passes through the zones of the light guide plate, and is transmitted to the annular light-emitting area to emit outwardly.

2. The electronic device according to claim 1, wherein the light guide plate comprises a plurality of extension portions respectively protruding from the first surface toward the directly-lit light sources, and a projection of the recessed structures on the first surface at least partially overlaps a projection of the extension portions on the first surface.

3. The electronic device according to claim 2, wherein a projection area of each of the recessed structures on the first surface is greater than a projection area of the corresponding directly-lit light source on the first surface, and a projection area of each of the extension portions on the first surface is greater than the projection area of the corresponding directly-lit light source on the first surface.

4. The electronic device according to claim 1, wherein a depth of the recessed structures is the same as a thickness of the light guide plate between the first surface and the second surface.

5. The electronic device according to claim 1, wherein each of the recessed structures comprises a flat surface and the semi-conical surface connected to the flat surface, and an included angle between the semi-conical surface and the flat surface is 45 degrees.

6. The electronic device according to claim 1, wherein the light guide plate comprises a through groove, and the light-shielding rib structure is fixed to the casing, passes through the through groove, and protrudes from the first surface.

7. The electronic device according to claim 1, wherein the light guide plate comprises a light-emitting slope facing the annular light-emitting area.

8. The electronic device according to claim 1, wherein the annular light-emitting area comprises a plurality of segments, the segments respectively correspond to the zones, and the segments have a same length.

9. The electronic device according to claim 8, wherein the segments comprise a plurality of midpoints, and there are a plurality of distances between the midpoints and a projection of the corresponding directly-lit light source on a plane where the annular light-emitting area is located, and the distances have an equal length.

10. The electronic device according to claim 8, wherein each of the segments comprises a corresponding midpoint, a distance between the midpoint and a projection of the corresponding directly-lit light source on a plane where the annular light-emitting area is located is used as a radius, a circle is drawn with the midpoint as a center, and among a plurality of circles drawn with the radius from the midpoint, any two adjacent ones partially overlap.

11. The electronic device according to claim 1, wherein the light emitted by the directly-lit light sources has different wavelengths, and a number of the directly-lit light sources is greater than or equal to 4.

12. The electronic device according to claim 1, wherein a depth of the semi-conical surface is the same as a bottom radius.

* * * * *